Nov. 15, 1955 — W. H. F. SCHMIEDING — 2,723,658
BRAZIER
Filed Aug. 17, 1954
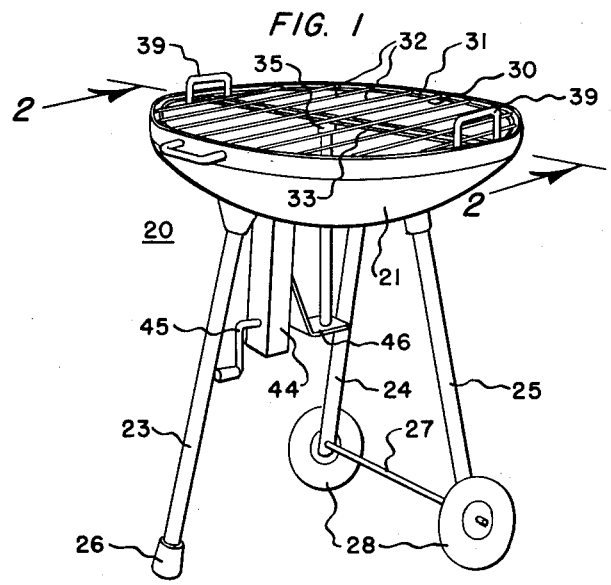
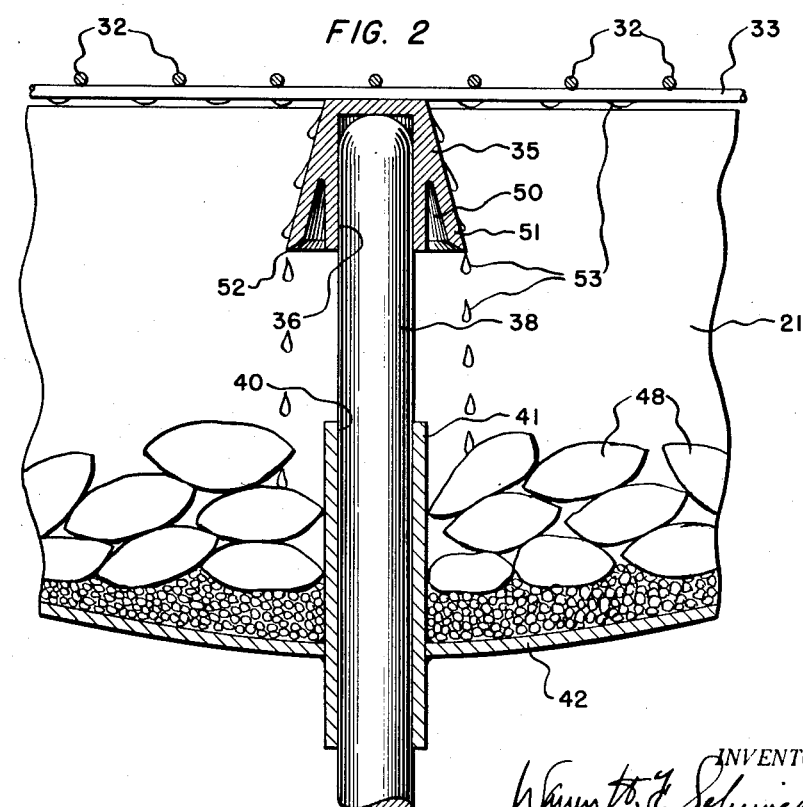

2,723,658
BRAZIER

Warren H. F. Schmieding, San Diego, Calif.

Application August 17, 1954, Serial No. 450,485

10 Claims. (Cl. 126—25)

The present invention relates to a brazier or broiler of the type used for broiling food, and more particularly to the type in which the grill, for supporting the food, can be raised and lowered, with respect to the fire bowl, by a rod which extends through a wall of the bowl.

In such brazier, the grill usually lies in a substantially horizontal plane above the coals in the bowl and is formed of wires supporting the food, and these wires are spaced from one another so that the food is heated by convection currents, by conduction, and by radiant heat. An open bottom socket is carried by the grill and this socket receives the top of the rod. The rod extends through the bottom of the fire bowl where it is supported by mechanism which is also utilized for raising and lowering the rod. Some of the grease or oil, rendered from meats during the cooking thereof, cling by capillary attraction to the underside of the wire grill and flows over the socket; from the socket, the oil or grease flows to the rod, then down the rod and through the bearing opening for the rod; whence it flows onto the floor. By my present invention, I prevent grease and oil from contacting the rod and thus prevent the escape of grease or oil through the bottom of the bowl.

Further objects and advantages will be apparent from the following description, reference being had to the accompanying drawings wherein a preferred embodiment of the invention is illustrated.

In the drawings:

Fig. 1 is a perspective view of one form of brazier or broiler to which the present invention has been applied; and Fig. 2 is a fragmentary sectional view, the section being taken substantially along line 2—2 of Fig. 1.

Referring more in detail to the drawings, the brazier 20 includes a fire bowl 21 which is carried by three legs 23, 24, and 25. Leg 23 is provided with a rubber shoe 26 and legs 24 and 25 carry an axle 27 at the lower ends thereof; this axle carries wheels 28.

A grill 30 is formed of a wire ring 31, parallel wires 32 connected to ring 31, and parallel cross wires 33. The wires 32 are spaced from one another, and wires 33 are spaced from one another, so that the food carried by the grill is subjected to upwardly flowing convection currents and radiant heat as well as to the heat of the wires. The underside of the grill carries a socket member 35. This socket member is suitably secured to the underside of cross wires 33; it is provided with a centrally disposed socket 36, open at the bottom for receiving the upper end of a vertically extending rod 38. The grill is provided with handles 39 for lifting the grill from the rod 38.

Rod 38 extends through an opening 40 in the bowl 21, the opening being provided by a hollow vertically extending bearing 41 which preferably extends below and above the bottom wall 42 of the bowl. A suitable standard type of elevator is provided for raising and lowering the rod 38. This elevator is shown at 44 which is actuated by a screw thread (not shown) through a crank 45. By turning the crank clockwise, the rod 38 is raised by the elevator platform 46, and, when the crank 45 is turned counterclockwise, the platform is lowered, the rod and grill following the platform due to the weight of the rod and grill. Thus the grill is raised and lowered relative to the coals 48 in the fire bowl.

Some of the grease or oil, which is rendered from particularly the meats, during the cooking thereof, flows along the wires 32, then onto the cross wires 33, whence it flows onto the top and/or the outer side walls of the socket member 35. The member 35 is of frusto-conical contour, forming a lower peripheral edge which extends radially outwardly beyond the confines of the opening 40 of the bearing 41 and radially outwardly beyond the top of the bearing. Thus, all grease and oil dripping from the peripheral lower edge of the member 35 will fall radially outwardly of bearing 41 and none will enter the bearing opening 40. To insure the prevention of flow of grease or oil from the peripheral lower edge of member 35 to the socket 36 and the rod 38, I provide an open bottom circumferential groove 50 in the underside of the member to thus form a skirt 51, the mouth or lower end of which has a width greater than the span effected by cohesion of the molecules of heated grease or oil. To further insure the dropping of the oil or grease at the peripheral lower edge, the lower end of the outside wall of groove 50 is tapered radially downwardly to form a substantially knife-shaped edge 52.

Thus, by my simple invention, I have prevented the flow of grease or oil through the rod opening in the bottom of the fire bowl. The flow of low volatile oil or grease is indicated by the drops 53. Some of this low volatile oil or grease will vaporize and burn as a gas as it falls from the knife edge 52 toward the fire, while other particles will fall into the hot coals and there be finally consumed.

While the form of embodiment herein shown and described constitutes a preferred form, it is to be understood that other forms may be adopted falling within the scope of the claims that follow.

I claim:

1. A brazier including a fire bowl for burning coals; a substantially horizontally-disposed grill means, for supporting food to be broiled, disposed above the bottom of the bowl and over the coal area; vertically movable rod means for supporting the grill from below the latter, said bowl having an opening through which the rod means extends, and said burning coils being adapted to surround the rod means; and means on one of the aforementioned means for directing grease or oil, rendered from the food on the grill means, to beyond the confines of said opening and onto said coal area.

2. A brazier including a fire bowl for burning coals; a substantially horizontally-disposed grill, for supporting food to be broiled, disposed above the bottom of the bowl and over the coal area; a vertically movable rod for supporting the grill from below the latter, said bowl having an opening through which the rod extends, and said burning coals being adapted to surround the rod; and means on the rod for directing grease or oil, rendered from the food on the grill, to beyond the confines of said opening and onto said coal area.

3. A brazier including a fire bowl for burning coals; a substantially horizontally-disposed grill, for supporting food to be broiled, disposed above the bottom of the bowl and over the coal area; a vertically movable rod for supporting the gril from below the latter, said bowl having an opening through which the rod extends, and said burning coals being adapted to surround the rod; and means attached to the grill and surrounding the upper part of the rod for directing grease or oil, rendered from the food on the grill, to beyond the confines of said opening and onto said coal area.

4. A device as defined in claim 1, characterized in that the grease or oil directing means is interposed between the grill and rod and directs the grease or oil radially of the rod and radially beyond the confines of the said opening in the fire bowl.

5. A brazier including a fire bowl for burning coals; a substantially horizontally-disposed grill, for supporting food to be broiled, disposed above the bottom of the bowl and over the coal area; a vertically movable rod for supporting the grill from below the latter, said bowl having an opening through which the rod extends, and said burning coals being adapted to surround the rod; means forming an open bottom socket, carrying the grill and extending substantially vertically for receiving the upper end of the rod and having means for directing grease or oil, rendered from the food on the grill, to beyond the confines of said opening and onto said coal area.

6. A device as defined in claim 5, characterized in that the socket means is provided with an open bottom circumferential groove.

7. A device as defined in claim 5, characterized in that the means for directing grease or oil comprises a skirt, the lower portion thereof extending radially beyond the confines of the said opening in the bowl.

8. A device as defined in claim 5, characterized in that the socket means is provided with an open bottom circumferential groove, the outer peripheral wall of said groove terminating at the lower end thereof in substantially knife-edge contour.

9. A device as defined in claim 5, characterized in that the means for directing grease or oil comprises a skirt, the lower portion thereof extending radially beyond the confines of said opening in the bowl and terminating in substantially knife-edge contour.

10. A brazier including an open top fire bowl for burning coals; a substantially horizontally-disposed grill, for supporting food to be broiled, disposed above the bottom of the bowl and over the coal area; a bearing on the bowl extending upwardly from the bottom wall of the bowl having a substantially vertically-extending opening therethrough, said burning coals being adapted to surround the bearing; a vertically movable rod extending from below the bowl through said opening and into the bowl above the bearing; means forming an open bottom socket carrying the grill and extending substantially vertically for receiving the upper end of the rod, said means including a skirt, the lower portion thereof extending radially beyond the confines of the opening in the bearing.

References Cited in the file of this patent

UNITED STATES PATENTS

| 57,577 | Saroni | Aug. 28, 1866 |
| 2,419,261 | Groetchen | Apr. 22, 1947 |
| 2,506,698 | Beals | May 9, 1950 |
| 2,622,591 | Bramberry | Dec. 23, 1952 |

FOREIGN PATENTS

| 127,210 | Switzerland | Aug. 16, 1928 |

OTHER REFERENCES

House Beautiful Magazine, vol. 95 No. 6, June 1953, page 70. Copy in Design Division, Des. 81–12.